United States Patent
Omata et al.

(10) Patent No.: US 8,736,585 B2
(45) Date of Patent: May 27, 2014

(54) INFORMATION PROCESSING APPARATUS AND METHOD, PROGRAM, AND RECORDING MEDIUM

(75) Inventors: Makoto Omata, Kanagawa (JP); Takuya Nezuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 943 days.

(21) Appl. No.: 11/539,735

(22) Filed: Oct. 9, 2006

(65) Prior Publication Data
US 2007/0103455 A1    May 10, 2007

(30) Foreign Application Priority Data
Oct. 20, 2005 (JP) ................ P2005-306136

(51) Int. Cl.
*G06F 3/033* (2013.01)
(52) U.S. Cl.
USPC ........................... 345/179; 345/173
(58) Field of Classification Search
USPC .................................. 345/173–179
See application file for complete search history.

(56) References Cited

U.S. PATENT DOCUMENTS

| | | | | |
|---|---|---|---|---|
| 5,067,573 | A * | 11/1991 | Uchida .................. | 345/173 |
| 5,590,257 | A * | 12/1996 | Forcier .................. | 715/273 |
| 6,034,685 | A * | 3/2000 | Kuriyama et al. ...... | 715/784 |
| 7,489,305 | B2 * | 2/2009 | Salisbury et al. ....... | 345/173 |
| 2001/0044908 | A1 * | 11/2001 | Siu ....................... | 713/323 |
| 2003/0151596 | A1 * | 8/2003 | Moyne et al. .......... | 345/173 |
| 2004/0027312 | A1 * | 2/2004 | Owada et al. .......... | 345/8 |
| 2004/0118743 | A1 * | 6/2004 | Yang et al. ............. | 206/701 |
| 2004/0212617 | A1 * | 10/2004 | Fitzmaurice et al. ... | 345/440 |
| 2005/0001812 | A1 * | 1/2005 | Amundson et al. .... | 345/107 |
| 2005/0270277 | A1 * | 12/2005 | Park ...................... | 345/173 |
| 2006/0133015 | A1 * | 6/2006 | Lin et al. ............... | 361/681 |
| 2006/0244737 | A1 * | 11/2006 | Dodge ................... | 345/179 |
| 2008/0186285 | A1 * | 8/2008 | Shimizu ................. | 345/173 |

FOREIGN PATENT DOCUMENTS

| | | |
|---|---|---|
| JP | 7-121287 | 5/1995 |
| JP | 07-306833 | 11/1995 |
| JP | 2001-111661 | 4/2001 |
| JP | 2005-25268 | 1/2005 |

OTHER PUBLICATIONS

Japanese Patent Office Action corresponding to Japanese Serial No. 2005-306136 dated Sep. 2, 2010.
Office Action issued Jun. 28, 2011, in Japanese Patent Application No. 2005-306136.

* cited by examiner

*Primary Examiner* — Alexander Eisen
*Assistant Examiner* — Nelson Lam
(74) *Attorney, Agent, or Firm* — Oblon, Spivak, McClelland, Maier & Neustadt, L.L.P.

(57) ABSTRACT

Provided is an information processing apparatus for receiving an input from a stylus pen and executing a predetermined process. The information processing apparatus includes: a housing unit detachably housing the stylus pen; detection means for detecting attachment and detachment of the stylus pen to and detachment from the housing unit; and execution means for executing a predetermined process in accordance with the detection result of the detection means.

14 Claims, 8 Drawing Sheets

INFORMATION PROCESSING APPARATUS AND METHOD, PROGRAM, AND RECORDING MEDIUM

CROSS REFERENCES TO RELATED APPLICATIONS

The present invention contains subject matter related to Japanese Patent Application JP 2005-306136 filed in the Japanese Patent Office on Oct. 20, 2005, the entire contents of which being incorporated herein by reference.

BACKGROUND

1. Technical Field

The present invention relates to an information processing apparatus and method, a program, and a recording medium, and more particularly, to an information processing apparatus and method, a program, and a recording medium, which can permit simple use of a stylus pen.

2. Background Art

As an input unit of a mobile terminal such as a personal digital assistance, a digital video camera, and a digital still camera of which decrease in size is advanced, there is known a pen-type input unit called a stylus pen.

A user can perform, for example, the same manipulation as pressing a mouse button by bringing the tip of the stylus pen into contact with an interface such as a touch panel to which an input is possible by a direct contact using a pen.

According to the stylus pen, the input can be performed by means of the pen tip and thus an input screen can be reduced in size in comparison with a case where the input is performed by means of a finger. Accordingly, the stylus pen is widely used as an input unit of a small-sized terminal device.

SUMMARY OF THE INVENTION

However, for example, when an input is performed with the stylus pen, the user should start a tool making the input with the stylus pen possible and perform manipulation for displaying a predetermined input picture to the terminal device.

The present invention makes it possible to simply start an input from a stylus pen, for example.

According to one embodiment of the invention, there is provided an information processing apparatus for receiving an input from a stylus pen and executing a predetermined process, the information processing apparatus including: a housing unit detachably housing the stylus pen; detection means for detecting attachment and detachment of the stylus pen to and detachment from the housing unit; and execution means for executing a predetermined process in accordance with the detection result of the detection means.

The execution means may permit the input from the stylus pen when the detection means detects the detachment of the stylus pen from the housing unit.

The execution means may display an input picture for receiving an input from the stylus pen and execute a process corresponding to the input to the input picture, when the detection means detects the detachment of the stylus pen from the housing unit.

The execution means may turn on the information processing apparatus, when the information processing apparatus is turned off and the detection means detects the detachment of the stylus pen from the housing unit.

The execution means may turn off the information processing apparatus, when the information processing apparatus is turned on and the detection means detects the attachment of the stylus pen to the housing unit.

The information processing apparatus may further include a display unit displaying an image and the execution means may control brightness of the display unit when the detection means detects the detachment of the stylus pen from the housing unit.

According to another embodiment of the invention, there are provided an information processing method and a program of an information processing apparatus having a housing unit detachably housing a stylus pen and receiving an input from the stylus pen to execute a predetermined process, the information processing method and the program including the steps of: detecting attachment and detachment of the stylus pen to and from the housing unit; and executing a predetermined process in accordance with the detection result.

In the information processing apparatus, the information processing method, and the program according to the embodiments of the invention, the attachment and detachment of the stylus pen to and from the housing unit is detected and a predetermined process is executed in accordance with the detection result.

According to the embodiment of the invention, it is possible to simply utilize the stylus pen.

BRIEF DESCRIPTION OF THE DRAWINGS

FIG. 1 is a diagram illustrating an external configuration of a digital still camera 1 which an embodiment of the present invention is applied to.

FIG. 7 is a diagram illustrating an external configuration of a mobile terminal 101 which an embodiment of the invention is applied to.

DESCRIPTION OF PREFERRED EMBODIMENTS

Hereinafter, embodiments of the invention will be described. Correspondences between constituent requirements of the invention and embodiments described in DESCRIPTION OF PREFERRED EMBODIMENTS are exemplified as follows. The following description is made to confirm that the embodiments supporting the invention are described in DESCRIPTION OF PREFERRED EMBODIMENTS. Accordingly, even when there exists an embodiment which is described in DESCRIPTION OF PREFERRED EMBODIMENTS but not described herein as an embodiment corresponding to the constituent requirements, it does not means that the embodiment does not correspond to the constituent requirements. On the contrary, even when an embodiment corresponding to the constituent requirements is described therein, it does not means that the embodiment does not correspond to constituent requirements other than the constituent requirements.

The information processing apparatus according to an embodiment of the invention is an information processing apparatus (for example, a digital still camera shown in FIG. 1) for receiving an input from a stylus pen and executing a predetermined process, the information processing apparatus including: a housing unit (for example, a housing unit 13 shown in FIG. 1) detachably housing the stylus pen; detection means (for example, an input control unit 21 shown in FIG. 2) for detecting attachment and detachment of the stylus pen to and detachment from the housing unit; and execution means (for example, a controller 23 shown in FIG. 2) for executing a predetermined process in accordance with the detection result of the detection means.

The execution means (for example, a controller 23 shown in FIG. 2) may permit the input from the stylus pen when the detection means detects the detachment of the stylus pen from the housing unit.

Figure 5:
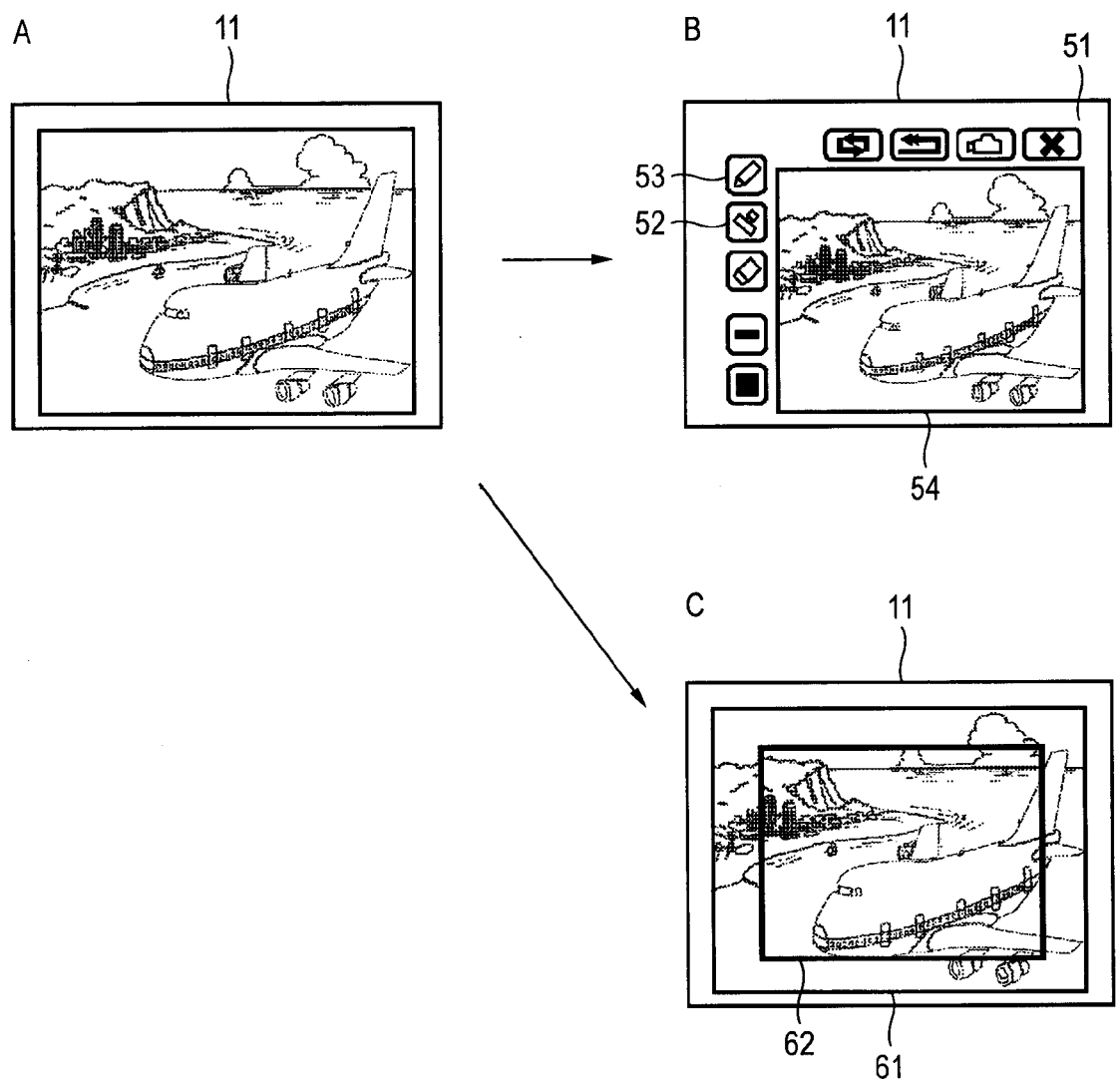
FIG. 5 is a diagram illustrating an example of a stylus input picture.

The execution means may display an input picture (for example, a stylus input picture 51 shown in FIG. 5) for receiving an input from the stylus pen and execute a process corresponding to the input to the input picture, when the detection means detects the detachment of the stylus pen from the housing unit.

Figure 4:
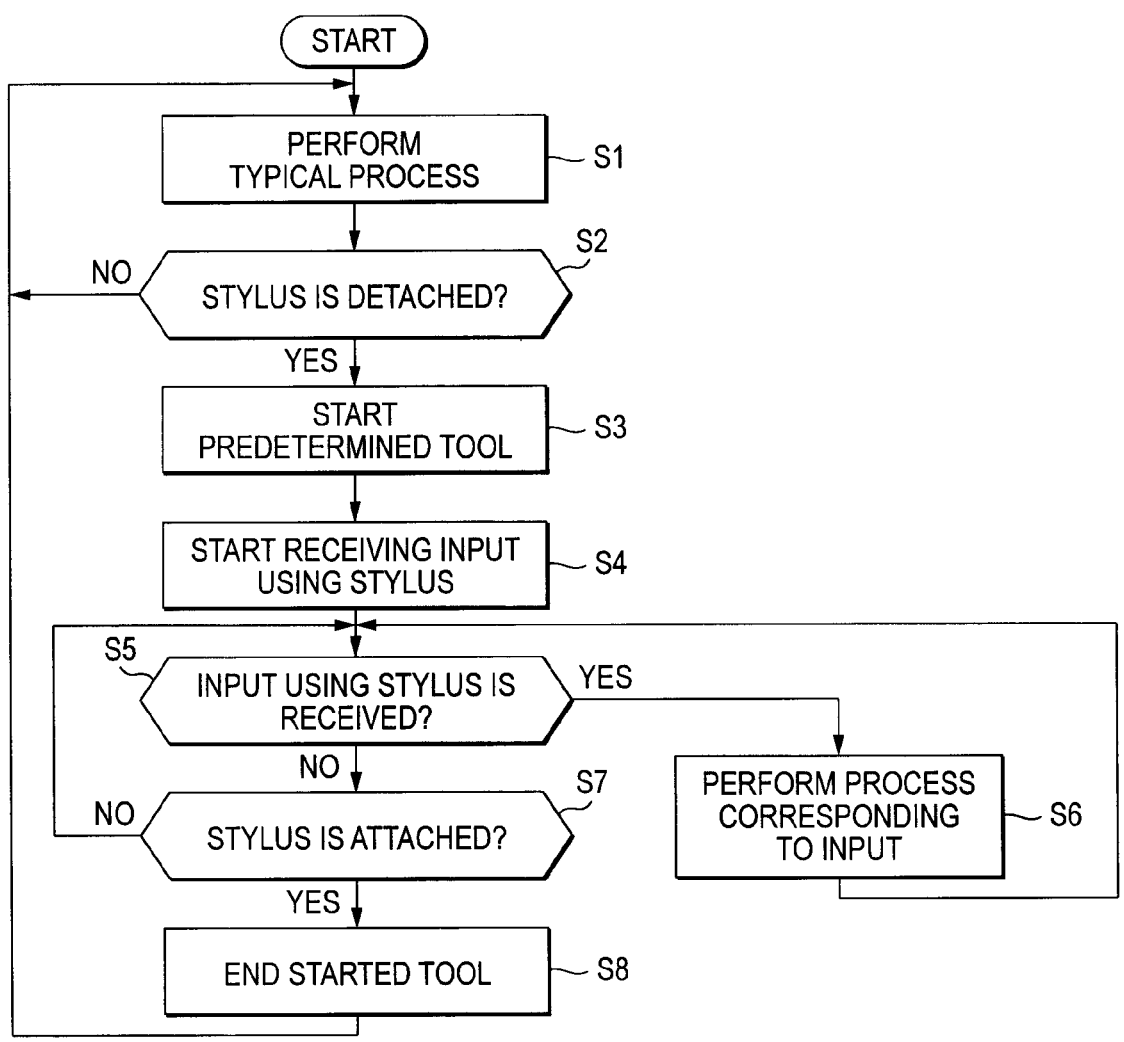
FIG. 4 is a flowchart illustrating an operation of the digital still camera 1 shown in FIG. 1.

The information processing method or the program according to another embodiment of the invention is an information processing apparatus of an information processing apparatus or a program making a computer process information in the information processing apparatus, the information processing apparatus having a housing unit detachably housing a stylus pen and receiving an input from the stylus pen to execute a predetermined process, the information processing method or the program including the steps of: detecting attachment and detachment of the stylus pen to and from the housing unit (for example, step S2 of FIG. 4); and executing a predetermined process in accordance with the detection result (for example, step S3 of FIG. 4).

Figure 1:
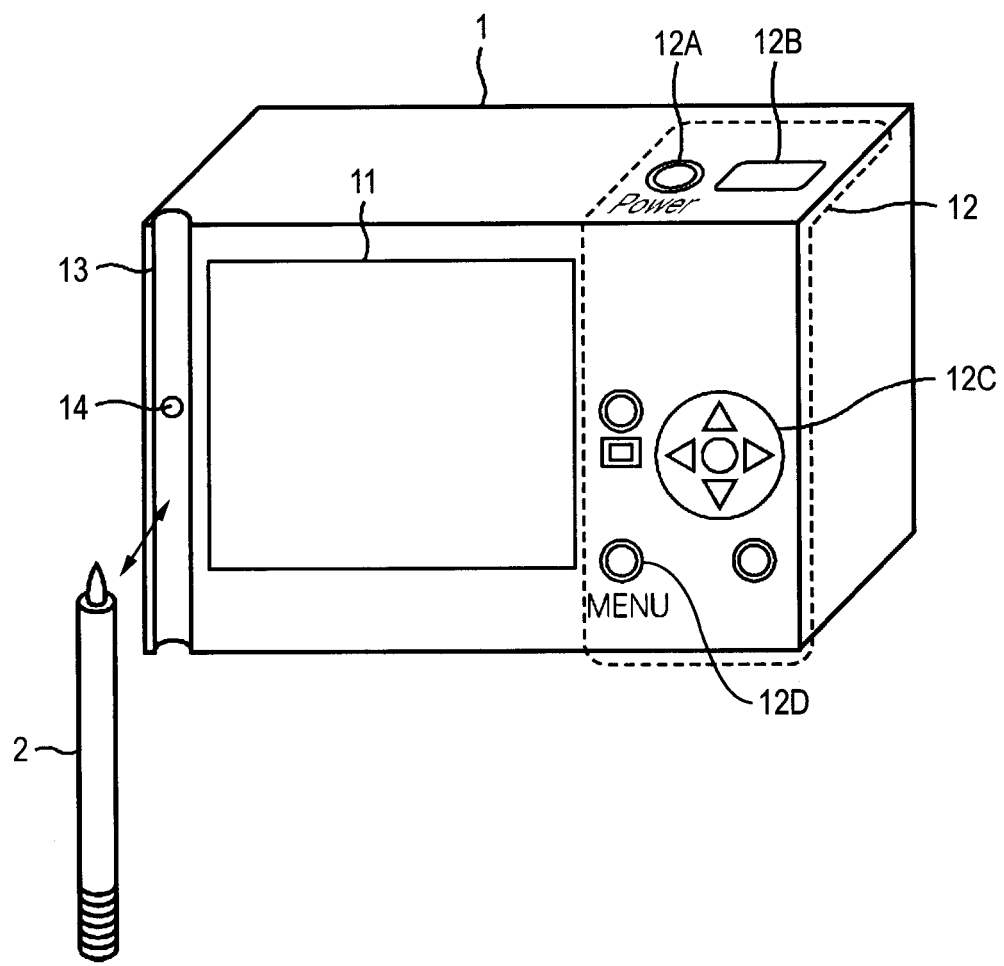

FIG. 1 illustrates an example of an outer configuration of a digital still camera 1 which the invention is applied to. The digital still camera 1 can pick up an image of a scene using a typical function of a digital still camera, can display or store the obtained image, and receive an input using a stylus pen 2 at the time of manipulation such as edition of an image. The stylus pen 2 is detachably attached to the digital still camera 1 and the digital still camera 1 has a function of performing a predetermined process in response to the attachment and detachment of the stylus pen 2 (which is described later).

An image taken with a lens not shown or an input picture (hereinafter, referred to as a stylus input picture) to which an input can be performed with the stylus pen 2 is displayed on a display unit 11 including an I/F such as a touch panel to which an input can be performed by means of a direct contact using a pen.

A button group 12 includes a power button 12A, a shutter button 12B, a cross key 12C, and a menu key 12D.

A housing unit 13 has such a configuration that the stylus pen 2 can be detachably attached thereto.

A switch 14 is disposed, for example, in the housing unit 13 and is turned on or off in accordance with the attachment or detachment of the stylus pen 2.

Figure 2:
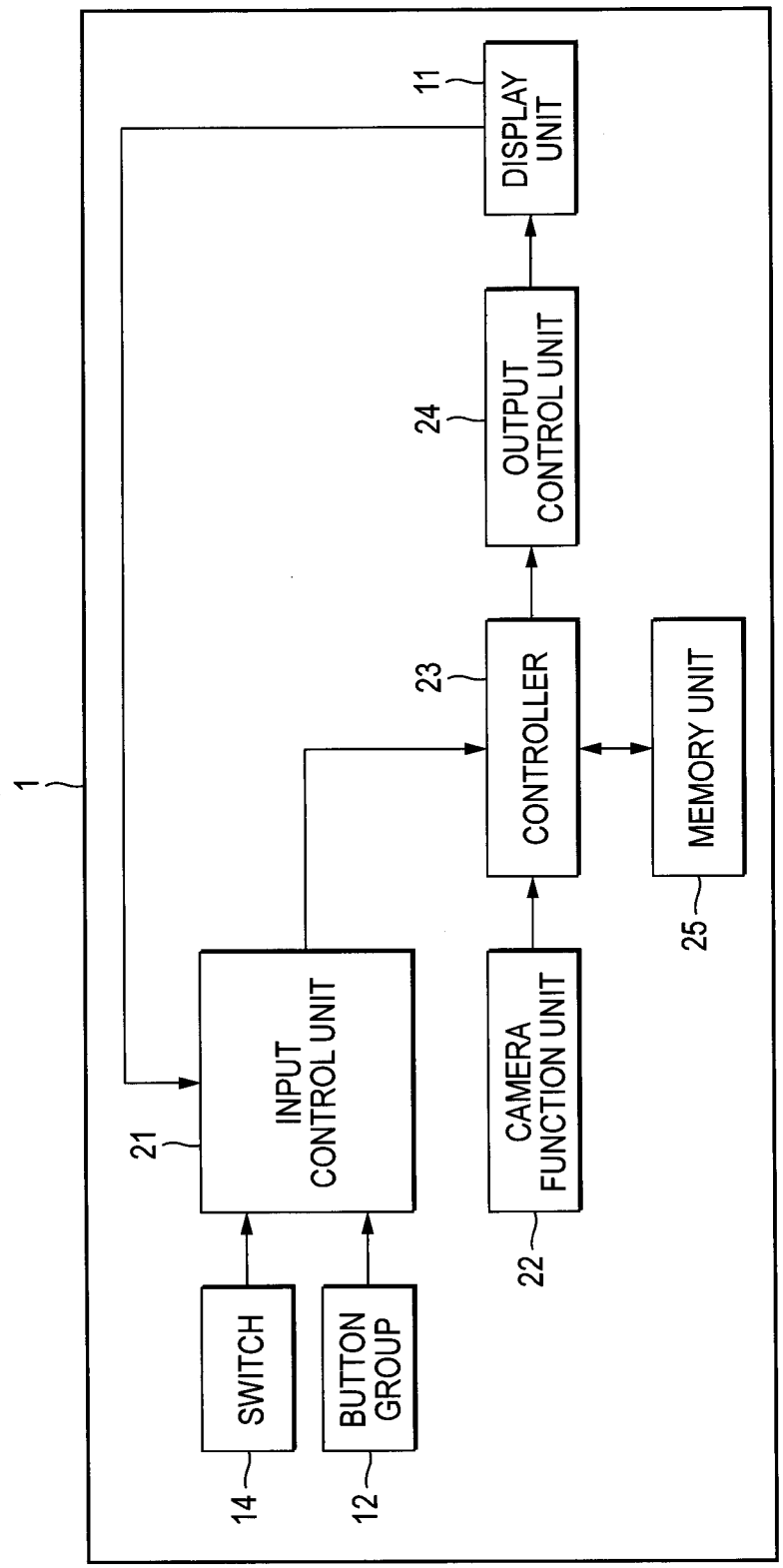
FIG. 2 is a block diagram illustrating an internal configuration of the digital still camera 1 shown in FIG. 1.

FIG. 2 illustrates an example of an inner configuration of the digital still camera 1.

An input control unit 21 receives signals from the button group 12 and the switch 14 and signals corresponding to the manipulation of the stylus input picture displayed on the display unit 11 and outputs signals corresponding to the input signals to a controller 23 (notifies the controller 23 of the input data).

For example, the input control unit 21 detects whether the stylus pen 2 is attached to the housing unit 13, depending on the ON and OFF states of the switch 14, and notifies the controller 23 of the detection result.

Figure 3:
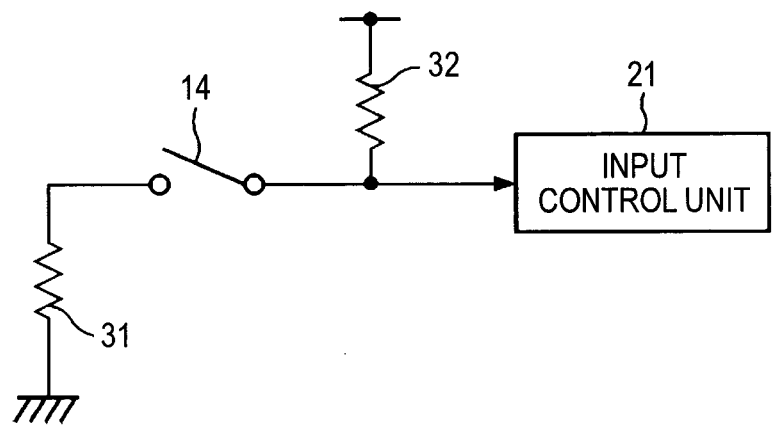
FIG. 3 is a diagram illustrating a connection configuration of a switch 14 shown in FIG. 1.

For example, as shown in FIG. 3, a resistor 31 connected to earth is connected to one terminal of the switch 14 and a resistor 32 connected to a power source is connected to the other terminal of the switch 14. When the switch 14 is in the ON state, an input to the input control unit 21 is low and when the switch 14 is in the OFF state, an input to the input control unit 21 is high. The input control unit 21 detects whether the stylus pen 2 is attached to the housing unit 13, depending on high or low of the signal from the switch 14 based on the ON/OFF of the switch.

The switch 14 is not limited to a mechanical contact point, but may be a switch using a photo resistor or the like.

Referring to FIG. 2 again, a camera function unit 22 performs an image process such as color space conversion and white balance to image data obtained by the image pickup of a camera unit not shown including a lens, a charge coupled device (CCD), and the like and supplies the resultant image data to the controller 23.

The controller 23 performs a predetermined process in accordance with the signal (input data) supplied from the input control unit 21.

For example, the controller 23 displays the image data supplied from the camera function unit 22 on the display unit 11 through the output control unit 24 or performs a predetermined compression process to the image data supplied from the camera function unit 22 to store the compressed image data in a memory unit 25. The controller 23 decompresses the compressed image data stored in the memory unit 25 and supplies the decompressed image data to the output control unit 24 to display the decompressed image data on the display unit 11.

When a notification that the stylus pen 2 is detached from the housing unit 13 is transmitted from the input control unit 21, the controller 23 starts a predetermined tool for receiving an input using the stylus pen 2 and controls the output control unit 24 to display a predetermined stylus input picture on the display unit 11.

The output control unit 24 controls a process of displaying the image data supplied from the controller 23 and the like on the display unit 11.

Next, operations of the input control unit 21 and the controller 23 corresponding to the attachment and detachment of the stylus pen 2 to and from the housing unit 13 will be described with reference to the flowchart shown in FIG. 4.

In step S1, the controller 23 performs a typical operation when the digital still camera 1 is turned on.

For example, the controller 23 controls the output control unit 24 to perform a process of displaying an image taken by the camera function unit 22 on the display unit 11. As a result, the image taken currently by the camera function unit 22, which is shown in FIG. 5A, is displayed on the display unit 11.

In step S2, the input control unit 21 judges whether the stylus pen 2 is detached from the housing unit 13, on the basis of the existence of a signal from the switch 14, and then waits until it is judged that the stylus pen is detached therefrom.

When it is judges in step S2 that the stylus pen 2 is detached from the housing unit 13, the input control unit 21 notifies the controller 23 of the fact in step S3. Accordingly, the controller 23 ends the process started in step S1, starts a predetermined tool which can be operated by the stylus pen 2, and displays the stylus input picture, which an input is performed to using the stylus pen 2, on the display unit 11. The stylus input picture may be displayed to overlap with the image taken by the camera function unit 22.

In this way, when the stylus input picture is displayed, the input control unit 21 starts receiving an input from the stylus input picture in step S4.

Next, the input control unit 21 judges in step S5 whether an input operation is performed to the stylus input picture displayed in step S3. When it is judged that the input operation is performed, the input control unit notifies the controller 23 of the input data in step S6. The controller 23 performs a process corresponding to the notification from the input control unit 21.

When it is judges in step S5 that the input operation is not performed to the stylus input picture, the input control unit 21 judges on the basis of the existence or non-existence of the signal from the switch 14 in step S7 whether the stylus pen 2 is attached to the housing unit 13. When it is judged that the stylus pen is not attached thereto, the input control unit performs again the processes subsequent to step S5.

When it is judged in step S7 that the stylus pen 2 is attached to the housing unit 13, the input control unit 21 notifies the controller 23 of the fact in step S8 and ends receiving the input from the stylus input picture displayed in step S3. The controller 23 ends the tool started in step S3.

Thereafter, the processes subsequent to step S1 are performed again.

Next, a specific example of the stylus input picture will be described.

FIG. 5B illustrates an example of the stylus input picture 51 displayed when a paint tool is started in step S3. A user can paint the image displayed on a display screen 54 of the stylus input picture 51 with a desired color by selecting an icon 52 on the stylus input picture 51 with the stylus pen 2 and can draw a diagram on the image displayed on the display screen 54 with the stylus pen 2 by selecting an icon 53. The image displayed on the display screen 54 is an image taken by the camera function unit 22 and stored in the memory unit 25.

FIG. 5C illustrates an example of the stylus input picture 61 displayed when an image edition tool is started in step S3.

The user can surround a desired portion of the image displayed on the stylus input picture 61 with a frame 62 by the use of the detached stylus pen 2, thereby cutting out the image of the desired portion.

As described above, when the stylus pen 2 is detached from the housing 13, a predetermined stylus input picture is displayed and the input using the stylus pen 2 is received. Accordingly, the user can display the stylus input picture without performing an operation of manipulating another button and thus can more simply use the stylus pen 2.

In the above description, the stylus input picture is displayed on the basis of the attachment or detachment of the stylus pen 2, but for example the digital still camera 1 may be turned on or off on the basis of the attachment or detachment of the stylus pen 2.

Figure 6:
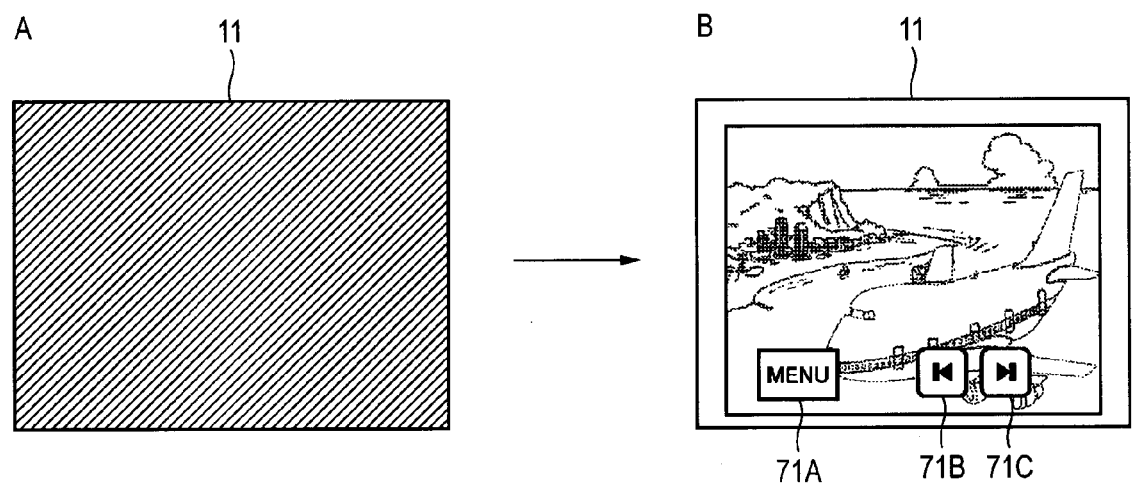
FIG. 6 is a diagram illustrating another example of the stylus input picture.

For example, in a state that the digital still camera 1 is turned off and none is displayed on the display unit 11 as shown in FIG. 6A, when the stylus pen 2 is detached from the housing unit 13, the digital still camera 1 may be turned on and the image taken by the camera function unit 22 may be displayed on the display unit 11 as shown in FIG. 6B.

In the example shown in FIG. 6B, menu buttons 71A, 71B, and 71C which can be selected with the stylus pen 2 are displayed. That is, in this example, a power supply can be turned on and the input using the stylus pen 2 can be performed only by detaching the stylus pen 2 from the housing unit 13.

When the stylus pen 2 is attached to the housing unit 13 in the state that the power supply is turned on, the power supply may be turned off.

In the process performed when the stylus pen 2 is detached therefrom, brightness of the display unit 11 may be adjusted. For example, when the stylus input picture is displayed on the display unit 11 and the stylus pen 2 is attached to the housing unit 13, the brightness of the display unit 11 may be lowered. When the stylus pen 2 is detached therefrom, the brightness of the display unit 11 may be restored to the normal state. That is, by enhancing the brightness of the display unit 11 only when the stylus pen 2 is detached therefrom and thus the input can be performed using the stylus pen 2, it is possible to reduce the power consumption.

Although the digital camera 1 has been exemplified in the above description, the invention is not limited to the digital still camera if only the input can be performed using the stylus pen. For example, the invention can be used in mobile terminals such as a digital video camera, a mobile phone, and a PDA.

Figure 7:
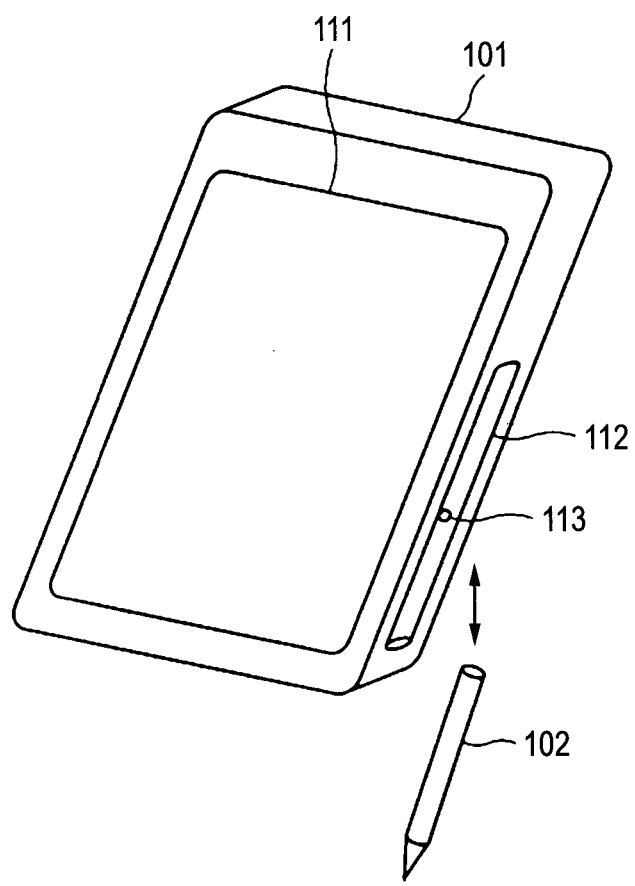

FIG. 7 illustrates an example of an outer configuration of a PDA 101 which the invention is applied to. The PDA 101 performs predetermined processes in response to attachment and detachment of a stylus pen 102, as shown in the flowchart of FIG. 4.

A variety of input pictures (including a stylus input picture), data, or images are displayed on a display unit 111.

The stylus pen 102 can be attached to and detached from a housing unit 112.

A switch 113 is disposed, for example, in the housing unit 112 and is switched on or off depending upon the attachment or detachment of the stylus pen 102.

Figure 8:
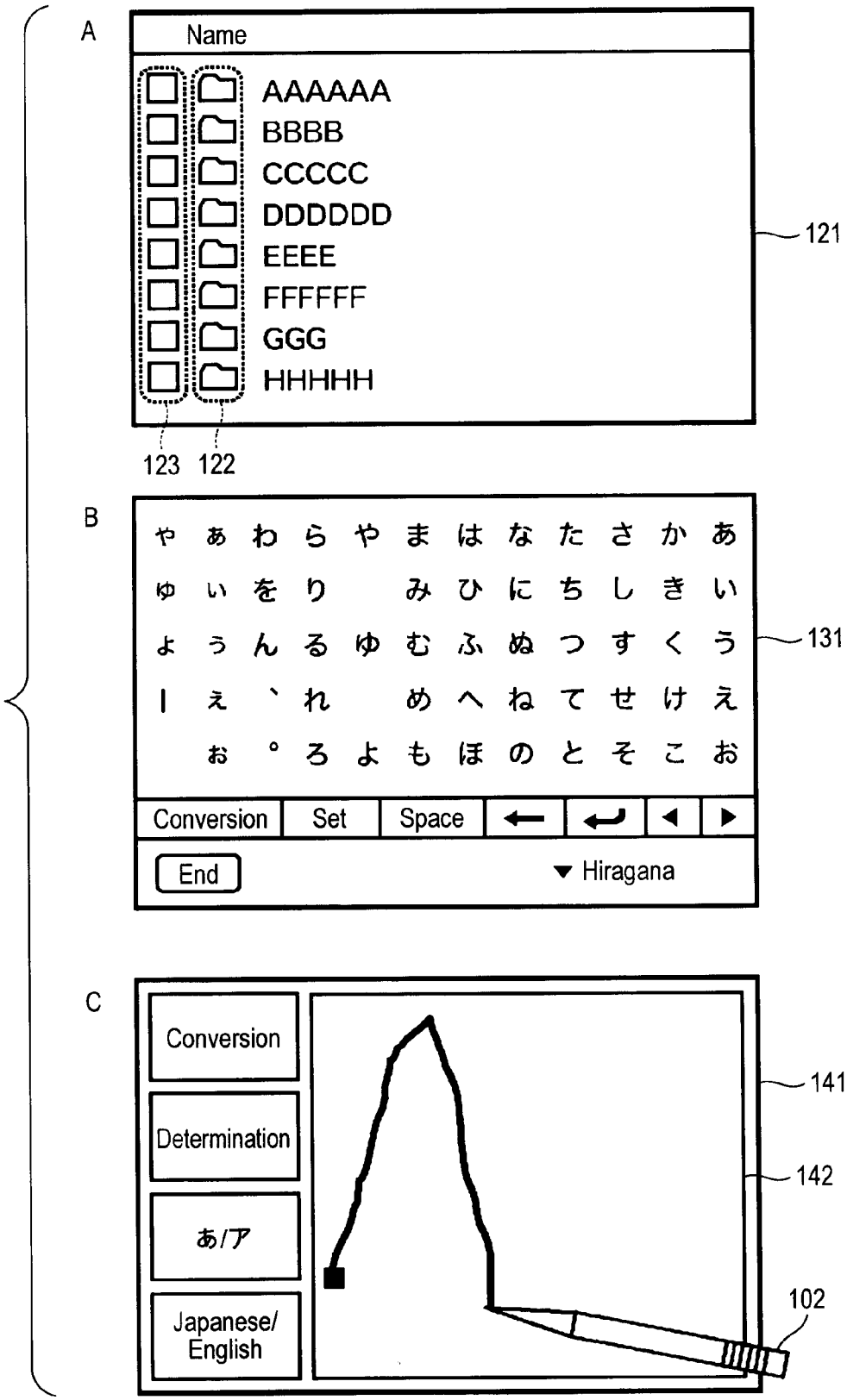
FIG. 8 is a diagram illustrating an example of another stylus input picture.

FIG. 8A illustrates an example of a stylus input picture 121 displayed when a file management tool is started in a process corresponding to the process of step S3 of FIG. 4. A user can display data and the like stored in a desired folder by checking a corresponding check box 123 with the detached stylus pen 102 to select an icon 122 indicating the desired folder.

FIG. 8B illustrates an example of a stylus input picture 131 displayed when a word processor tool is started in a process corresponding to the process of step S3. A user can prepare a sentence with selected characters by selecting characters on a displayed keyboard with the detached stylus pen 102.

FIG. 8C illustrates an example of a stylus input picture 141 displayed when a dictionary tool is started in a process corresponding to the process of step S3. A user can display a meaning or the like of a word by inputting a predetermined word to an input unit 142 with the detached stylus pen 102.

The above-mentioned series of processes may be executed by hardware or software. When the series of processes are executed by software, a program constituting the software is installed, for example, in a computer having dedicated hardware built therein or a general-purpose personal computer, in which a variety of programs can be installed to execute a variety of functions, from a program recording medium.

Examples of the program recording medium can include removable media which are package media such as magnetic discs (including flexible discs), optical discs (including CD-ROM (Compact Disc-Read Only Memory) and DVD (Digital Versatile Disc)), magneto-optical disc, and semiconductor memories and ROMs and hard discs in which programs are temporarily or permanently stored. The storage of a program in the program recording medium is performed using wired or wireless communication media such as local area networks, Internet, and digital satellite broadcasting through interfaces such as routers or modems as needed.

It should be understood by those skilled in the art that various modifications, combinations, sub-combinations, and alternations may occur depending on design requirements and other factors insofar as they are within the scope of the appended claims or the equivalents thereof.

What is claimed is:

1. An information processing apparatus for receiving an input from a stylus pen and executing a predetermined process, the information processing apparatus comprising:
   a housing unit detachably housing the stylus pen;
   a detection unit which detects attachment and detachment of the stylus pen to and detachment from the housing unit;
   an execution unit which executes a first predetermined process in accordance with the detection result of the detection unit;
   an input picture capturing unit which captures an input picture; and
   a display unit that displays the input picture captured by the input picture capturing unit, wherein
   upon determination that the information processing apparatus is turned on and the detection unit detects the detachment of the stylus pen from the housing unit, the execution unit executes the first predetermined process in which a predetermined tool that permits input from the stylus pen is displayed on the display unit, the predetermined tool having at least an icon for receiving an input from the stylus pen,
   upon determination that the icon is selected by the stylus pen, the execution unit executes a second predetermined process enabling a user to selectively input an alteration to the input picture in accordance with the selected icon using the stylus pen to input the alteration via the input picture, and
   upon determination that the detection unit detects that the stylus pen is reattached to the housing unit, the execution unit terminates the first predetermined process in which the display of the predetermined tool is removed from the display unit, terminates input from the stylus pen, and the information processing apparatus remains turned on.

2. The information processing apparatus according to claim 1, wherein the execution unit turns on the information processing apparatus upon determination that the information processing apparatus is turned off and the detection unit detects the detachment of the stylus pen from the housing unit.

3. The information processing apparatus according to claim 1, wherein the execution unit controls brightness of the display unit upon determination that the detection unit detects the detachment of the stylus pen from the housing unit.

4. The information processing apparatus according to claim 1, wherein the icon identifies the alternation as painting the input picture.

5. The information processing apparatus according to claim 1, wherein the icon identifies the alternation as one of a plurality of colors for painting the input picture.

6. The information processing apparatus according to claim 1, wherein the icon identifies the alternation as drawing a diagram on the input picture.

7. An information processing method of an information processing apparatus having a housing unit detachably housing a stylus pen and receiving an input from the stylus pen to execute a predetermined process, the information processing method comprising the steps of:
   detecting attachment and detachment of the stylus pen to and from the housing unit;
   capturing an input picture using an input capture unit;
   displaying the input picture on a display unit;
   executing, upon determination that the information processing apparatus is turned on and detachment of the stylus pen from the housing unit is detected, a first predetermined process in which a predetermined tool that permits input from the stylus pen is displayed on the display unit, the predetermined tool having an icon for receiving an input from the stylus pen;
   executing, upon determination that the icon is selected by the stylus pen, a second predetermined process enabling a user to selectively input an alteration to the input picture in accordance with the selected icon using the stylus pen to input the alternation via the input picture; and
   terminating, upon determination that the stylus pen is reattached to the housing unit, the first predetermined process in which the display of the predetermined tool is removed from the display unit and input from the stylus pen, wherein
   the processing apparatus remains turned on upon determination that the stylus pen is reattached to the housing unit.

8. The information processing method according to claim 7, wherein the executing step turns on the information processing apparatus upon determination that the information processing apparatus is turned off and the detecting step detects the detachment of the stylus pen from the housing unit.

9. The information processing method according to claim 7, wherein the executing step controls brightness of the display unit upon determination that the detecting step detects the detachment of the stylus pen from the housing unit.

10. The information processing method according to claim 7, wherein the icon identifies the alternation as painting the displayed input picture.

11. The information processing method according to claim 7, wherein the icon identifies the alternation as one of a plurality of colors for painting the displayed input picture.

12. The information processing method according to claim 7, wherein the icon identifies the alternation as drawing a diagram on the input picture.

13. A non-transitory computer readable storage medium having instructions stored therein, which when executed by a processor in an information processing apparatus having a housing unit detachably housing a stylus pen and receiving an input from the stylus pen to execute a predetermined process causes the processor to execute a method comprising the steps of:
   detecting attachment and detachment of the stylus pen to and from the housing unit;
   capturing an input picture using an input capture unit;
   displaying the input picture on a display unit;
   executing, upon determination that the information processing apparatus is turned on and detachment of the stylus pen from the housing unit is detected, a first predetermined process in which a predetermined tool that permits input from the stylus pen is displayed on the display unit, the predetermined tool having an icon for receiving an input from the stylus pen;
   executing, upon determination that the icon is selected by the stylus pen, a second predetermined process enabling a user to selectively input an alteration to the input picture in accordance with the selected icon using the stylus pen to input the alternation via the input picture; and terminating, upon determination that the stylus pen is reattached to the housing unit, the first predetermined process in which the display of the predetermined tool is removed from the display unit and input from the stylus pen, wherein the processing apparatus remains turned on upon determination that the stylus pen is reattached to the housing unit.

14. An information processing apparatus for receiving an input from a stylus pen and executing a predetermined process, the information processing apparatus comprising:

housing means for detachably housing the stylus pen;

detection means for detecting attachment and detachment of the stylus pen to and detachment from the housing means;

execution means for executing a first predetermined process in accordance with the detection result of the detection means;

input picture capturing means for capturing an input picture; and display means for displaying the input picture, wherein upon determination that the information processing apparatus is turned on and the detection means detects the detachment of the stylus pen from the housing means, the execution means executes the first predetermined process in which a predetermined tool that permits input from the stylus pen is displayed on the display means, the predetermined tool having an icon for receiving an input from the stylus pen, upon determination that the icon is selected by the stylus pen, the execution means executes a second predetermined process enabling a user to selectively input an alteration to the input picture in accordance with the selected icon using the stylus pen to input the alternation via the input picture, and upon determination that the detection means detects that the stylus pen is reattached to the housing means, the execution means terminates the first predetermined process in which the display of the predetermined tool is removed from the display means, terminates input from the stylus pen, and the information processing apparatus remains turned on.

* * * * *